Jan. 21, 1930. H. EULBERG 1,744,535
TIRE RIM AND RIM RING TOOL
Filed June 26, 1928
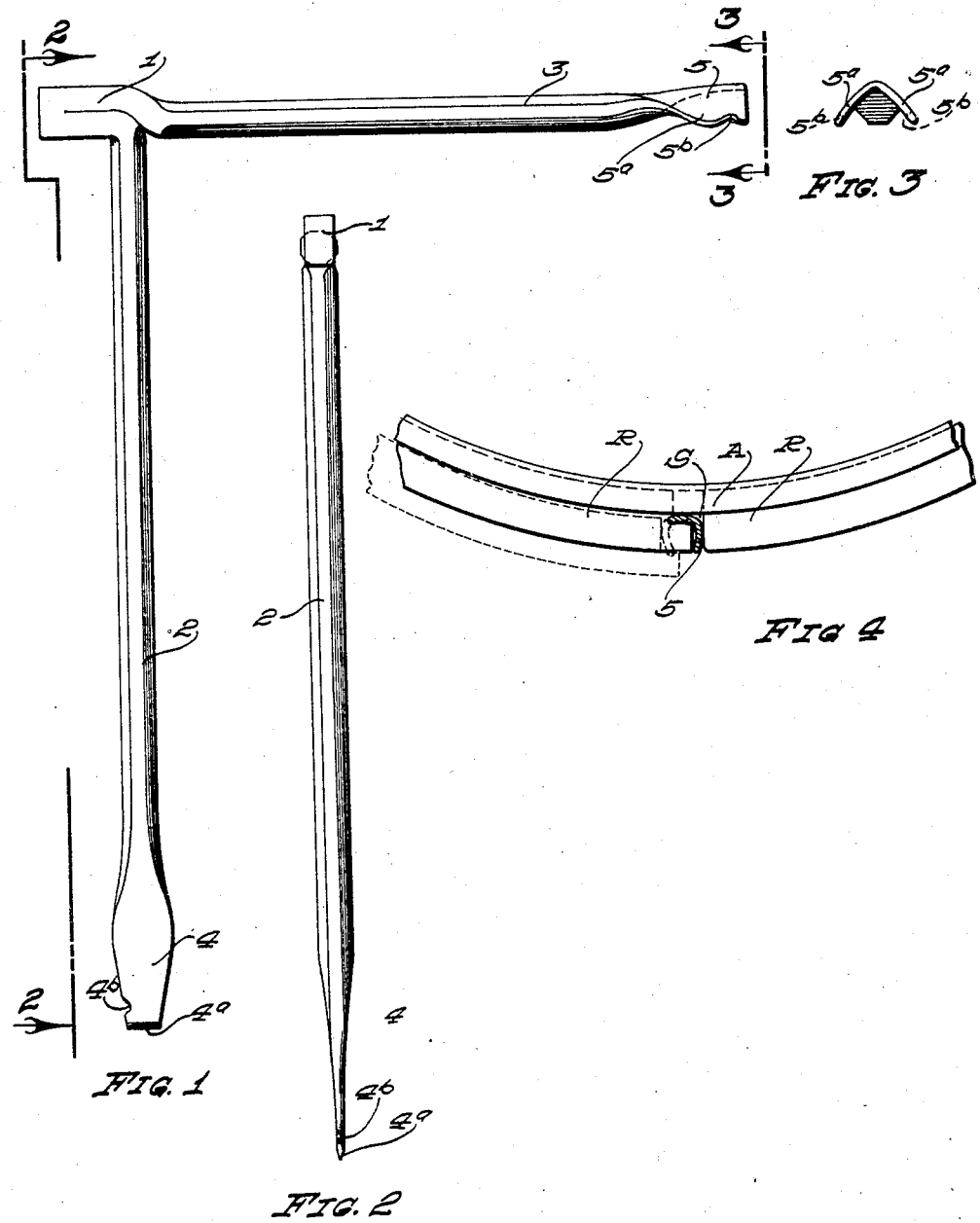
INVENTOR.
HENRY EULBERG
BY A.B.Bowman
ATTORNEY Patented Jan. 21, 1930

1,744,535

UNITED STATES PATENT OFFICE

HENRY EULBERG, OF OCEAN BEACH, CALIFORNIA

TIRE-RIM AND RIM-RING TOOL

Application filed June 26, 1928. Serial No. 288,387.

My invention relates to tire rim and rim ring tools and the objects of my invention are: First, to provide a tool of this class which is adapted to be used on all styles and kinds of tire rims; second, to provide a tool of this class which eliminates the use of many tools formerly required to remove tires from or replace tires upon rims; third, to provide a tool of this class which affords considerable leverage for springing side clamping rings or locking rings from tire rims or for springing split tire rims so that they may be removed from a tire; fourth, to provide a tool of this class which has an enlarged hammer portion integral therewith to further facilitate the work of removing tires; fifth, to provide a tool of this class which may be made of a single piece of material, thereby providing a device which is exceedingly economical of construction; sixth, to provide a tool of this class which is extremely sturdy of construction, and which will stand rough usage; seventh, to provide a tool of this class which is so constructed as to perform a maximum number of the functions necessary to remove or replace a tire on a rim; and eighth, to provide a tool of this class which is durable, and which will not readily deteriorate.

With these and other objects in view as will appear hereinafter my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a side elevational view of my tire rim and tire rim ring tool; Fig. 2 is another elevational view thereof from the line 2—2 of Fig. 1; Fig. 3 is an end elevational view from the line 3—3 of Fig. 1; and Fig. 4 is a fragmentary side elevational view of a conventional rim with the one end of my tool shown in section.

Similar characters of reference refer to similar parts and portions throughout the several views of the drawings.

The hammer member 1, arms 2 and 3, wedge member 4 and spoon member 5 constitute the principal parts and portions of my tool.

My tool is preferably made of a single piece of material, bent double near its central portion forming a hammer member 1. The two arms 2 and 3 thus formed extend adjacent to each other for a short distance. The one arm 2 is then bent at approximately right angles to the arm 3, forming a substantially T-shaped member with the one portion of the cross thereof much shorter and thicker than the other.

The end of the arm 2 is flattened forming a wedge shaped member 4. The wedge member 4 on being flattened is also widened at its central portion as shown best in Fig. 1 of the drawings. The extreme end 4ª of the wedge member 4 is beveled to a blunt point. Near the extremity and at the one edge of the wedge member 4 is a notch 4ᵇ.

The extremity of the arm 3 is flattened and curved longitudinally forming an open ended spoon member 5 with the side walls 5ª slightly curved and merging into each other at approximately right angles as shown best in Figs. 3 and 4 of the drawings. Notches 5ᵇ are provided in the edges of the side walls 5ª near their extremities as shown in Fig. 1 of the drawings.

In a conventional tire rim in which the tire is held in position by means of a side ring, locking ring or clamping ring R the adjacent portions of said ring are formed substantially as shown in Fig. 4 forming with the outer edge of the tire rim A a substantially L-shaped slot S. With rims having such a construction the spoon member 5 is inserted in the L-shaped slot as shown by the sectional view of the rim tool in Fig. 4 of the drawings. The rim tool is then twisted by using the arm 2 as a lever until in position as shown by dotted lines in Fig. 4. When in this position the one end of the side ring, locking ring or clamping ring R is raised to the position as shown by dotted lines. Any suitable wedge inserted between the inner edge of the ring R and the outer edge of the rim A can then easily remove the ring.

In some cases the adjacent ends of the ring member of tire rims abut each other leaving only a rectangular shaped slot. In this case it is necessary to use the wedge shaped end 4.

Although only one type of rim has been shown in this connection with the tool herein described the shape of the ends 4 and 5 are adapted for many other uses in connection with tire rims, the hammer portion 1 serving to loosen a member before using the end members 4 or 5. Thus it can be seen that there is provided a tool which is adapted for many uses in connection with the tire rims and tire rim parts.

Though I have shown and described a particular construction, combination and arrangement of parts and portions I do not wish to be limited to this particular construction, combination and arrangement but desire to include in the scope of my invention, the construction, combination and arrangement substantially as set forth in the appended claims.

Having thus described my invention what I claim as new and desire to secure by Letters Patent is:

1. A rim tool, having an arm member formed with a flattened end bent or angular in cross-section, and having oppositely positioned notches in its side walls, and a second arm extending at an angle with said first arm and integral therewith forming a lever therefor.

2. A rim tool, having an arm member formed with a flattened end angular in cross-section, and a second arm extending at an angle with said first arm forming a lever therefor.

In testimony whereof, I have hereunto set my hand at San Diego, California, this 20th day of June, 1928.

HENRY EULBERG.